3,166,428
GLASS FIBER COMPOSITIONS

George L. Thomas, Parma, Ohio, assignor to The B. F. Goodrich Company, New York, N.Y., a corporation of New York
No Drawing. Filed July 11, 1963, Ser. No. 294,239
7 Claims. (Cl. 106—50)

This application is a continuation-in-part of my copending application Serial Number 102,673, filed April 13, 1961, and now abandoned.

This invention relates to a glass composition which is especially suitable for the manufacture of glass fibers of high Young's modulus and high tensile strength. The glass composition of this invention has fiber spinning properties comparable to a sodium calcium silicate glass and also the boro silicate glass composition commonly known in the trade as E glass, yet, fibers spun from this new glass composition have an average tensile strength of at least 30% to 50% greater than the tensile strength of E glass fibers of corresponding gauge.

The art recognized standard for high strength glass fibers, as shown in "High Modulus Glass Fibers for Structural Plastics," The Glass Industry, December 1960, page 600 et seq., is commercial filament "E" glass. The composition of E glass is set forth as:

| Component— | Percent |
|---|---|
| $SiO_2$ | 54.5 |
| $Al_2O_3$ | 14.5 |
| CaO | 17.0 |
| MgO | 4.5 |
| $B_2O_3$ | 8.5 |
| $Na_2O$, $K_2O$, $TiO_2$, $Fe_2O_3$ | 1.0 |

Because of the substantial improvement in tensile strength compared to E glass fibers of corresponding gauge, fibers made from the glass composition of this invention are especially useful for the manufacture of glass reinforced plastic articles and particularly filament wound glass-plastic pressure vessels. Moreover, laminates of these high strength glass fibers in a plastic matrix have been found to be at least 30% to 50% better in flex strength than corresponding identical laminates prepared with commercially available E glass fibers.

The glass composition disclosed can be melted, formed into marbles, remelted and drawn into fibers by conventional methods employed in the art. Fibers formed from my new glass find ready application in articles where a high strength to weight ratio is important. Pressure bottles and tanks to hold liquids and gases, particularly under high pressures, are widely used in aircraft to store oxygen, hydraulic fluid, deicing fluid and the like, and any new material which will make a stronger article for the same weight, or a lighter article with the same strength as can be made with presently used materials finds ready interest and acceptance.

While I have succeeded in making a glass composition of extremely high tensile strength, my glass composition also has good spinning characteristics for drawing into continuous filament glass. It has a long working range of approximately 250° F.

My new glass exhibits a Young's modulus of about $13 \times 10^6$ p.s.i. in the uncompacted fiber which is an impressive increase over the modulus of commercial continuous filament fiber glass which is about $11 \times 10^6$ p.s.i.

This glass has a workable liquidus temperature, and can be spun under ordinary spinning conditions without the use of special nozzles, cooling or handling and without devitrification which is quite unexpected because of its high alumina content.

The great strength of my glass, when it is drawn into fibers or filaments, is believed to be due to its specific compositional range. A glass with high tensile strength, long spinning range, slow rate of crystallization, and increased Young's modulus may be made in the following compositional range.

| Ingredient: | Proportion |
|---|---|
| $SiO_2$ | 35–56 |
| $Li_2O$ | 1–11 |
| $K_2O + Na_2O$ | [1] 0–10 |
| Alkaline earth oxide | [2] 4–15 |
| ZnO | 0–10 |
| $Sb_2O_3$ | 0–10 |
| $Al_2O_3$ | 25–35 |

[1] With the sum of $Li_2O + K_2O + Na_2O$ always equal to 1–11.
[2] Wherein the alkaline earth oxide is selected from the group consisting of CaO, MgO, and CaO+MgO wherein when it is CaO+MgO, the ratio of CaO to MgO is at least 9:1.

It is to be noted that this is an aluminum silicate glass, an unusual type to employ for a spinning glass.

As is common in glass technology, the ingredients are given above in terms of oxides of the elements. The compounds may actually be added to the glass batch in several different forms, however. Lithium, potassium and sodium may be added as carbonates, as can calcium and magnesium.

The alkali oxide is employed as a flux in the glass. Lithia has a small ionic radius and relatively high field strength for alkali ions. It is an essential ingredient of the glass and must always be present in an amount equal to at least 1 percent by weight of the batch. Lithia can range up to 11 percent by weight of the batch, but higher amounts of alkali oxide than 11 percent lead to glasses that have too short a working range. Potassium oxide ($K_2O$) and soda ($Na_2O$) may be used as part of the alkali oxide used to make my glass to help fluxing properties but there must always be at least 1 percent by weight of lithia and the total of $Li_2O + K_2O + Na_2O$ must not exceed 11 percent by weight of the batch. The alkaline earth oxides, calcia and magnesia are both useful separately in the preparation of my glass, but I have found that if both are used in the same batch, the weight ratio of CaO to MgO is preferably at least 9:1. This means that while I can add the CaO and MgO in the forms of the carbonate, as mentioned above, I can not use dolomite or dolomitic limestone which is essentially $CaMg(CO_3)_2$. I have found that dolomite, wherein CaO and MgO are present in an equimolar ratio, gives me glasses much lower in tensile strength than the glass of my invention. The same is true of any approximately equimolar mixture of calcium and magnesium that may be employed. Ordinary calcitic limestone is primarily calcium carbonate and nearly always contains some magnesium carbonate as an impurity. If the limestone contains less than 10 weight percent of magnesium carbonate, it can be used in preparing the glass batch of my invention. Either CaO or MgO may be used separately in my glass batches, but when they are used together, the magnesium must not exceed 10% by weight of the calcium.

Zinc oxide is a stabilizing and surface hardening agent. Antimony oxide improves homogeneity of the glass by reducing gas bubbles and acts to improve the working properties of the glass.

The high alumina content of this glass is believed to be a primary cause of the high tensile strength developed. Incorporating such high amounts of alumina in a glass is difficult, since it tends to cause devitrification at the low temperatures employed for spinning. The successful results I have achieved are believed to be due to the use of lithia and the correct proportioning of the remaining constituents.

The glass of this invention, when drawn into fibers, has a tensile strength superior to that of commercially available filament glasses and in improved Young's modulus. It melts readily in existing glass melting units, and is easily spun in ordinary platinum type spinning units.

To compare various batches of my glass with each other and with continuous filament E glass, I have employed a single filament tensile test as follows:

The glass batch is mixed, melted, formed into cullet, remelted in a single hole platinum bushing and drawn through a single platinum nozzle. The same nozzle is employed in all cases. The filament is drawn at the rate of 5,000 feet per minute; and a length of approximately 10″ of filament is cut from the section between the nozzle and the drawing wheel during spinning. The sample is mounted on a cardboard containing 5 one inch openings along the length of the filament. The filament ends overlapping the end of the cardboard are removed and checked for diameter under a microscope. They should agree within 0.00002 inch. The filament is glued to the cardboard at the end of each opening and the cardboard is cut transversely to the filament between the openings to give 5 one inch lengths of filament which can be mounted in an Instron Testing Machine for tensile test. With every filament or group of filaments a control filament of commercial E glass is run. The control is taken as 100 (an arbitrary value) and the tensile strength of the test glass is reported as percent of the control.

In another evaluation test for my glass fibers, I prepare fiber-resin laminates. The first step in forming these laminates is to prepare unidirectional mats by winding the glass filaments on a rotating drum and spraying them with a plastic resin. The resin employed is an epoxy resin. This is a low viscosity, 50–140 cps. at 25° C., resin containing 69–72%, non-volatile matter and assaying 350–500 g./g. mole epoxy groups. The resin is applied to the glass fiber by spraying from a solvent solution. An amine catalyst hardener is mixed with the resin solution and initiates the partial cure of the resin in the matrix on the drum. The unidirectional mats are built up of glass fiber and resin to a thickness of about 0.010 inch and contain 10–20% by weight of resin. Enough layers of mat are plied together, with the fibers still unidirectional, to form a stiff laminate sheet about $\frac{1}{10}$ to $\frac{1}{8}$ inch thick after compaction and final cure in a press at 7,000–8,000 p.s.i. and 300° F.

Strips 6″ x 1″ with the fibers of the laminates lengthways are cut from the press cured laminate and tested according to ASTM test D790–58T "Tentative Method for Flexural Properties of Plastics," for flexural strength and modulus of elasticity.

Young's modulus is run on the uncompacted fiber by a standard sonic method utilizing measurement of the speed of sound transmitted through the glass. This method is described in J. App. Physics 20, 493 (1949).

The glass composition of my invention is illustrated by the following examples wherein the ingredients are proportioned by weight. Continuous filament commercial E glass is used as the control in all tests run.

EXAMPLES 1–10

Batches are mixed to give the following oxide compositions, melted in a small clay or platinum crucible at 2550°–2650° F. and formed into marbles. The marbles are remelted in platinum bushings and drawn into single filament and 204 filament form. The filaments are processed as described above. Glass compositions and test data are summarized in Table 1. Standard E glass, employed as the control, is melted and drawn through the same nozzles as the test glasses and at the same drawing speeds.

Table 1
EXAMPLES 1–10

| | Control | 1 | 2 | 3 | 4 | 5 | 6 | 7 | 8 | 9 | 10 |
|---|---|---|---|---|---|---|---|---|---|---|---|
| $SiO_2$ | Comm. E Glass | 49.5 | 48.1 | 44.0 | 51.1 | 55.3 | 50.0 | 48.9 | 50.6 | 55.0 | 54.5 |
| $Li_2O$ | | 6.3 | 4.9 | 3.1 | 6.2 | 5.5 | 6.3 | 10.2 | 6.3 | 1.7 | 4.4 |
| $Na_2O$ | | | 1.9 | 1.5 | | 0.9 | | | 1.0 | | |
| $K_2O$ | | | 3.3 | 3.4 | | 0.9 | | | 1.1 | | |
| $CaO$ | | 9.5 | 7.4 | 13.0 | 7.9 | | 5.8 | 7.6 | 9.7 | 12.0 | |
| $MgO$ | | 0.7 | 0.6 | 1.0 | 0.6 | 4.3 | 4.1 | 0.6 | 0.8 | | 13.0 |
| $ZnO$ | | | | 2.0 | | 0.9 | | | 1.0 | | |
| $Sb_2O_3$ | | | 0.6 | 2.0 | | 0.9 | | | 1.0 | | |
| $Al_2O_3$ | | 34.0 | 33.2 | 30.0 | 34.2 | 31.3 | 33.8 | 32.7 | 28.5 | 31.0 | 28.2 |
| Young's modulus p.s.i.×$10^6$ | 11.0 | 13.0 | 12.4 | 12.8 | 12.9 | 12.9 | 13.2 | 13.4 | | 12.7 | 12.9 |
| Single filament Tensile strength, percent of control=100: | 100 | 140 | 130 | 150 | 157 | 136 | 95 | 145 | 138 | 134 | 135 |
| Laminate flex. strength, p.s.i. | 220,000 | 291,000 | 250,000 | 296,000 | 282,000 | | | | | | |
| Laminate mod. of elasticity, p.s.i.×$10^6$ | 8.7 | 10.7 | 9.5 | 10.6 | 10.3 | | | | | | |
| Percent of resin in laminate by weight | 10.4 | 11.6 | 10.7 | 14.7 | 11.5 | | | | | | |

Comparison of these data indicates that glasses 1–5 of my invention considerably exceed commercial continuous filament E glass in modulus, tensile and flexing strength. Much stronger laminates can be prepared from my new glass and plastic resins than from presently available fiber glass. Example 6 shows the negative effect of employing dolomitic limestone to provide the alkaline earth ingredients. Example 7 is made with 10.2 percent lithia. The high amount of alkali oxide gives the glass a short working range. Example 9 shows the use of CaO alone as the alkaline earth oxide ingredient. Examples 5 and 10 show the use of MgO alone as the alkaline earth oxide ingredient.

I claim:

1. Aluminum silicate glass fibers consisting in percent by weight of:

$SiO_2$ ---- 44.0–55.3.
$Li_2O$ ---- 1.7–10.2.
$Na_2O+K_2O$ ---- 5.2 with the sum of $Li_2O+Na_2O+K_2O$ always equal to 1.7–10.2.
Alkaline earth oxide ---- 4–15 selected from the group consisting of CaO, and CaO+MgO wherein when both CaO and MgO are employed, the ratio of CaO to MgO is at least 9:1.
$ZnO$ ---- Up to 10.
$Sb_2O_3$ ---- Up to 10.
$Al_2O_3$ ---- 28.2–34.2.

said glass fibers having an average tensile strength at least 30% greater than the tensile strength of E glass fibers of corresponding gauge.

2. Aluminum silicate glass fibers consisting in percent by weight of:

$SiO_2$ ---- 44.0–55.3.
Alkali oxide ---- 1.7–10.2, said alkali oxide being selected from the group consisting of $Li_2O$ and $Li_2O+Na_2O+K_2O$ wherein when mixed $Li_2O+Na_2O+K_2O$ are used, the amount of $Li_2O$ is at least 1.7 and the sum of $Na_2O+K_2O$ is 2.1 to 5.2.
$CaO+MgO$ ---- 4–15 wherein the ratio of CaO to MgO is at least 9:1.
$ZnO$ ---- 0–10.
$Sb_2O_3$ ---- 0–10.
$Al_2O_3$ ---- 28.2–34.2.

said glass fibers having an average tensile strength at least 30% greater than the tensile strength of E glass fibers of corresponding gauge.

3. An aluminum silicate glass fiber consisting essentially in percent by weight of:

| | |
|---|---|
| $SiO_2$ | 55.3 |
| $Li_2O$ | 5.5 |
| $Na_2O$ | 0.9 |
| $K_2O$ | 0.9 |
| $MgO$ | 4.3 |
| $ZnO$ | 0.9 |
| $Sb_2O_3$ | 0.9 |
| $Al_2O_3$ | 31.3 | said glass fiber having an average tensile strength at least 30% greater than the tensile strength of E glass fibers of corresponding gauge.

4. An aluminum silicate glass fiber consisting essentially in percent by weight of:

| | |
|---|---|
| $SiO_2$ | 51.1 |
| $Li_2O$ | 6.2 |
| $CaO$ | 7.9 |
| $MgO$ | 0.6 |
| $Al_2O_3$ | 34.2 | said glass fiber having an average tensile strength at least 30% greater than the tensile strength of E glass fibers of corresponding gauge.

5. An aluminum silicate glass fiber consisting essentially in percent by weight of:

| | |
|---|---|
| $SiO_2$ | 44.0 |
| $Li_2O$ | 3.1 |
| $Na_2O$ | 1.5 |
| $K_2O$ | 3.4 |
| $CaO$ | 13.0 |
| $MgO$ | 1.0 |
| $ZnO$ | 2.0 |
| $Sb_2O_3$ | 2.0 |
| $Al_2O_3$ | 30.0 | said glass fiber having an average tensile strength at least 30% greater than the tensile strength of E glass fibers of corresponding gauge.

6. An aluminum silicate glass fiber consisting essentially in percent by weight of:

| | |
|---|---|
| $SiO_2$ | 48.1 |
| $Li_2O$ | 4.9 |
| $Na_2O$ | 1.9 |
| $K_2O$ | 3.3 |
| $CaO$ | 7.4 |
| $MgO$ | 0.6 |
| $Sb_2O_3$ | 0.6 |
| $Al_2O_3$ | 33.2 | said glass fiber having an average tensile strength at least 30% greater than the tensile strength of E glass fibers of corresponding gauge.

7. An aluminum silicate glass fiber consisting essentially in percent by weight of:

| | |
|---|---|
| $SiO_2$ | 49.5 |
| $Li_2O$ | 6.3 |
| $CaO$ | 9.5 |
| $MgO$ | 0.7 |
| $Al_2O_3$ | 34.0 | said glass fiber havng an average tensile strength at least 30% greater than the tensile strength of E glass fibers of corresponding gauge.

References Cited by the Examiner
UNITED STATES PATENTS

| | | | |
|---|---|---|---|
| 2,685,527 | 8/54 | Labino | 106—50 |
| 3,044,888 | 7/62 | Provance | 106—50 |
| 3,095,311 | 6/63 | Von Wranau et al. | 106—50 |

FOREIGN PATENTS

| | | |
|---|---|---|
| 124,553 | 6/47 | Australia. |
| 551,326 | 1/58 | Canda. |
| 902,563 | 12/44 | France. |
| 765,244 | 1/57 | Great Britain. |

OTHER REFERENCES

Karkhavavale et al.: J. Am. Cer. Soc.; December 1953, "Reactions in the System $Li_2O$—$MgO$—$Al_2O_3$—$SiO_2$:I, The Cordierite-Spodumene Join" (page 394).

Lajarte: German Appl. 1,088,675, printed September 8, 1960 (Kl. 32b 1).

TOBIAS E. LEVOW, *Primary Examiner.*